Jan. 8, 1963    R. A. MAYNE ETAL    3,072,424
HUB
Filed Feb. 12, 1959

INVENTOR.
ROBERT A. MAYNE and
WILFORD H. TEETER
BY
Their Attorneys

United States Patent Office 3,072,424
Patented Jan. 8, 1963

3,072,424
HUB
Robert A. Mayne and Wilford H. Teeter, Dayton, Ohio; said Teeter assignor to said Mayne; Ruth D. Mayne executrix of said Robert A. Mayne, deceased
Filed Feb. 12, 1959, Ser. No. 792,911
12 Claims. (Cl. 287—52)

This invention relates to a hub for mounting a disc, pulley or other element on a shaft. While the invention is useful in a wide variety of applications, it is particularly suited to use in a blower wheel assembly.

Cast hubs have been frequently used in securing disc elements and the like to shafts. These are very expensive.

It is advantageous to use stampings from sheet metal. These are lightweight and amenable to quick and inexpensive manufacturing processes. Heretofore, however, it has been necessary to use complicated dies and oftentimes a plurality of punching or stamping steps to produce a sheet metal hub having sufficient durability and strength. Also, in stamped hubs, nuts or other screw retaining members have been required to insure a positive, vibration free engagement between the set screw or like member and the shaft upon which the hub is mounted.

An object of this invention is to provide a hub having a simple, lightweight, yet rugged and reliable construction, embodying a small number of elements which may be made of sheet metal and manufactured by simple punching or stamping operations.

A further object of this invention is to provide a hub made of only two members of stamped sheet material assembled in interfitting relationship. Even though the hub of this invention is of a simple and lightweight construction, it is capable of forming a positive and reliable connection between the element to be rotated and the rotary shaft upon which the element is mounted. No nut or other retaining member is required to prevent dislodgement of the locking screw from the shaft.

Another object of this invention is to provide a hub composed of a primary support member and a secondary support member assembled in interfitting relationship, having axially aligned openings for mounting the support members upon a rotary shaft. The hub so formed is easily manufactured and of lightweight construction, yet capable of providing a positive and rugged support for a member to be rotated by the shaft.

A still further object of this invention is to provide a hub composed of two interfitting support members having axially aligned openings in opposed walls thereof for mounting the hub upon a rotary shaft and additionally having contacting peripheral walls, one press-fitted within the other, extending between the opposed end walls. The peripheral walls are provided with communicating openings for the provision of locking means for securing the hub to the rotary shaft.

In one embodiment of this invention, separate support members are provided with means on one support member for securing the support member to the disc or other rotary device.

Accordingly, it is a further object of this invention to provide means on one of the support members for securing the hub to the element to be rotated.

In a second embodiment one of the support members is integral with the element to be rotated. The support member is formed by a stamping or punching operation performed upon the rotary element.

Accordingly, it is an additional object of this invention to form one of the support members integral with the element to be rotated.

Other objects and advantages reside in the construction of parts, the combination thereof, the method of manufacture and the mode of operation, as will become more apparent from the following description.

Referring to the drawings, FIGURE 1 is a perspective view of the invention shown prior to assembly with the rotating element.

FIGURE 5 is an end elevational view and FIGURE 4 a sectional view, taken along lines 4—4 of FIGURE 5.

Figure 2:
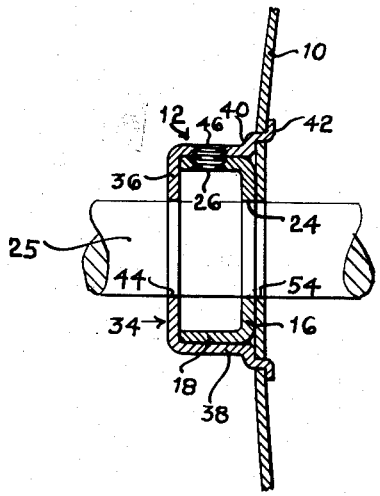
FIGURE 2 is a sectional view of the invention showing the assembled hub and rotating element.
Figure 3:
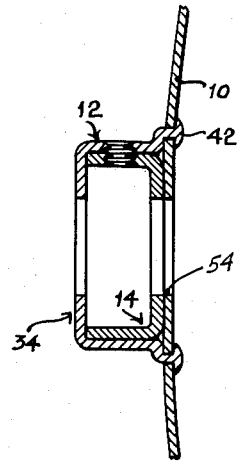
FIGURE 3 is a sectional view of the invention showing a preferred manner of assembling the hub and element to be rotated.
Figure 1:
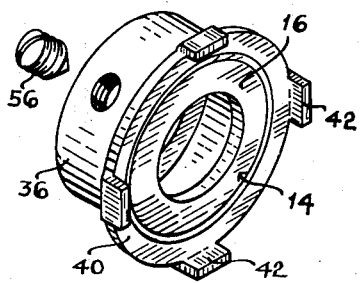

Referring to FIGURES 1 to 3, a hub 12 is shown as secured to a disc or other rotary element 10. Disc 10 may form a portion of a fan, pulley or other rotating device, such as the rotary support for a blower wheel. Hub 12 comprises a generally cup-shaped primary support member 14 having a flat end wall 16 integral with a cylindrical peripheral wall 18. A secondary cup-shaped support member 34, likewise having a flat end wall 36 integral with a cylindrical peripheral wall 38, overlies the primary support 14. Secondary support member 34 is additionally provided with an annular flange 40 on the end of peripheral wall 38 opposite to end wall 36. A plurality of annularly spaced projections or lugs 42 are carried by flange 40. In assembling the hub 12 and the element 10, the projections 42 are inserted into apertures formed in element 10 and then projections 42 are simply bent over, as shown in FIGURE 2, or preferably peened or upset, as shown in FIGURE 3. By this construction, a substantial area of disc 10 is held in contact over the entire surface of annular flange 40 and end wall 16, thereby providing a firm lateral support for the disc.

To mount the hub on a rotary shaft 25, substantially axially aligned openings 24 and 44 are provided in end walls 16 and 36, respectively. Of course, a similar opening 54 must be provided in the rotary element 10. Further, communicating radial openings 26 and 46 are provided in peripheral walls 18 and 38, respectively. Radial openings 26 and 46 are screw threaded to provide for a set screw or the like 56, which engages the rotary shaft 25 to lock the assembled hub 12 thereon.

The hub shown in FIGURES 1 to 3 may be easily and inexpensively manufactured. Cup-shaped support members 14 and 34 are readily formed by employing suitable dies in a punch press. No welding or similar step must be performed in the manufacturing process, since member 14 is inserted with a press fit into the cavity of cup-shaped member 34. The assembly of the completed hub with the disc 10 is likewise simple and void of expensive or time consuming manufacturing steps, since the projections 42 are simply bent or upset. Further, no nut or similar screw retainer is required to insure a positive engagement of the set screw 56 with the rotary shaft, since sufficient screw threads are provided in both radial openings 26 and 46 to render the set screw substantially immobile when in engagement with the shaft.

Even though extremely simple in manufacture, the hub described in connection with FIGURES 1 to 3 is highly advantageous, in that it adds little weight to the rotary element mounted on the shaft. While simple in construction, the hub provides durability heretofore unattainable at low cost. Since openings 24 and 44 are spaced and since support 14 is press-fitted within support 34, the hub provides an unusually firm and sturdy support for the rotary element 10. Note also that the presence of two contiguous peripheral walls renders the hub unusually resistant to radial blows, a property present only in solid hub members heretofore.

Figure 4:
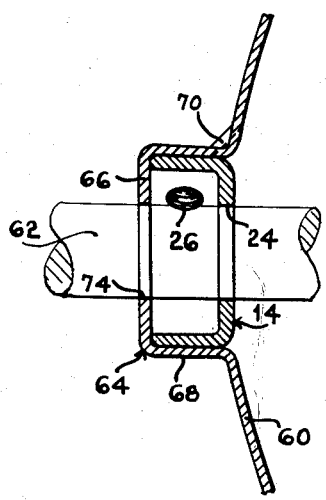
FIGURES 4 and 5 show a second embodiment of this invention in which the hub is formed in part by the element to be rotated.
Figure 5:
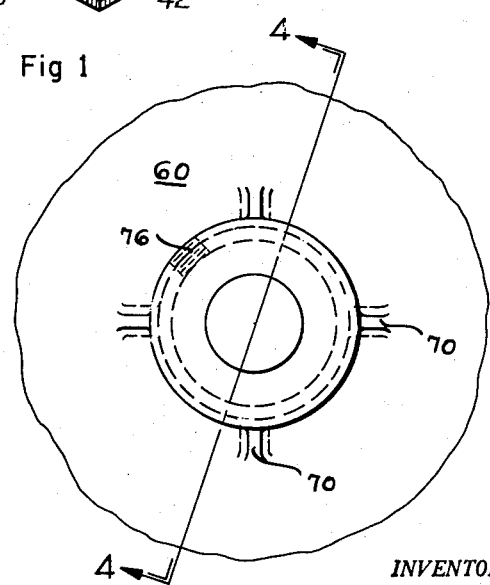

In FIGURES 4 and 5, a second embodiment is shown, which generally has the same advantages of the device shown in FIGURES 1 to 3; but has the additional advantage that the assembling of the primary and secondary supports and the assembling of the completed hub with the disc are performed in a single operation. In this single operation, it is unnecessary to provide perforations in the rotary element and the step of bending or upsetting the attaching projections 42 is dispensed with. This is accomplished by utilizing the center portion of the element to be rotated as the secondary support member. As in the FIGURES 1 to 3 embodiment, a considerable area of contact is provided between the primary support member and the disc.

As shown in FIGURE 4, a primary support member 14, identical to support 14 in FIGURES 1 to 3, engages rotary element 60 which has been punched to provide a cylindrical member 64 extending from said disc. Cylindrical member 64 constitutes a generally cup-shaped support similar to the secondary support member 34 in FIGURES 1 to 3 and has a flat end wall 66 integral with cylindrical peripheral wall 68. As in the FIGURES 1 to 3 embodiment, axially aligned openings 24 and 74 are provided in the end walls of the primary and secondary support members for mounting the hub upon a shaft 62. Radial openings 26 and 76 in the two supporting members again provide for a set screw which serves to lock the hub in position on the shaft. A plurality of ribs 70 may be placed about the periphery of the portion of the rotary element serving as the support member in order to overcome any weakness in the rotary element caused by the punching operation.

The manufacture and assembly of this embodiment may be performed very economically. Suitable dies may be devised so that only one punching operation on the rotary element is required to form the secondary support member and one punching operation on the primary support 14. Again, primary support member 14 is inserted into the cavity formed in the secondary support member with a press fit.

Furthermore, the same forming dies may be used for various sizes of shafts, it being merely necessary to select the proper size punches for the holes for the particular shaft size. For accuracy the holes for the shafts may be reamed.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. A hub combination for mounting a disc or other device on a shaft comprising: a primary support member having a flat end wall abutting said disc and a cylindrical peripheral wall integral with said flat end wall, a secondary support member having a flat end wall and a cylindrical peripheral wall which overlies and is in contact with the peripheral wall of said primary support member, said end walls being located on opposite ends of the peripheral walls and having axially aligned openings receiving said shaft, and means for locking said support members on said shaft.

2. A hub assembly adapted for use on a shaft, said hub assembly consisting of an outer cup-shaped member having a cylindrical wall portion, one end of which merges directly into an inwardly directed and apertured end wall portion and the other end thereof merges into an outwardly directed flange portion, with an inner cup-shaped member having a cylindrical peripheral wall, one end of which merges directly into an inwardly directed and apertured end wall portion and the other end of the last mentioned cylindrical peripheral wall abuts the inwardly directed end wall portion of the outer cup-shaped member, the inwardly directed end wall portion of the inner cup-shaped member being aligned with the outwardly directed flange portion of the outer cup-shaped member so that there is an inwardly directed wall portion at both margins of the cylindrical walls of the hub assembly, the cylindrical walls being telescopically and press-fitted together.

3. The device of claim 2, in which said peripheral walls are provided with communicating radially threaded openings and in which said locking means comprises a set screw extending through said radial openings.

4. A device for supporting a disc or the like on a shaft comprising a primary support member and a secondary support member, each of said support members having an end wall and a peripheral wall, said end walls being spaced and said peripheral walls being press-fitted together, the end wall of the primary support abutting the side of said disc, said end walls having axially aligned openings for mounting said support members on a shaft, said secondary member including a peripheral flange integral therewith and lying in substantially the same plane as the end wall of said primary member, means on said flange to secure said disc to said secondary member, and means for locking said support members on said shaft.

5. The device of claim 4, in which said securing means comprises projections radially spaced about the circumference of said flange.

6. Apparatus for mounting a disc or the like on a shaft comprising a primary support member, a secondary support member joined to said disc or the like, each of said support members being generally cup-shaped and including a flat end wall and a cylindrical peripheral wall, the flat end walls being located on opposite ends of the cylindrical peripheral walls, said primary member being press-fitted into said secondary member to form a hub housing bounded by said end walls and the peripheral wall of said secondary member, one of said end walls abutting said disc, axially aligned openings in said end walls and communicating radial openings in said peripheral walls.

7. In a device for supporting a disc or other rotary element for rotation in a plane, the combination of a primary support member having a flat, disc-shaped end wall lying in said plane, a cylindrical peripheral wall having one end thereof integral with the periphery of said end wall, a secondary support member having an end wall lying in a plane parallel to and spaced from the end wall of said primary support member, a second cylindrical peripheral wall having one end integral with the end wall of said secondary support member which overlies and is in contact with the peripheral wall of said primary support member, said end walls having axially aligned openings, said peripheral walls having threaded radial openings through which a set screw is passed, and means on said secondary support member for supporting said disc in its plane for rotation.

8. In combination: a disc having a central opening, means to mount said disc on a shaft comprising two interfitting cup-shaped support members, the end walls of said support members being spaced and having openings axially aligned with the central opening of said disc, the peripheral walls of said support members each being provided with a radial opening, said radial openings communicating one with the other, and locking means extending through said radial openings to secure said support members on said shaft, one of said support members being joined to said disc.

9. The device of claim 8, in which said secondary support member is integral with said disc.

10. The device of claim 8, further including a peripheral flange integral with said secondary member and lying in substantially the same plane as the end wall of said primary member, and means on said flange to secure said disc to said secondary member.

11. Apparatus for mounting a disc or the like on a shaft comprising a primary support member, a secondary support member joined to said disc or the like, each of said support members being generally cup-shaped and including a flat end wall and a cylindrical peripheral wall, said primary member being press-fitted into said secondary member to form a hub housing bounded by said end walls and the peripheral wall of said secondary member, one of said end walls abutting said disc, axially aligned openings in said end walls and communicating radial openings in said peripheral walls, said secondary member having a peripheral flange integral therewith and lying in substantially the same plane as the end wall of said primary member, and means on said flange to secure said disc to said secondary member.

12. In combination, a generally disc-shaped member; a cylindrical member attached to said disc member and extending therefrom, an end wall integral with the end of said cylindrical member, said end wall being opposite the end of the cylindrical member from which the disc member extends, a support member having an end wall lying substantially in the plane of the disc member, and a peripheral wall integral with said last mentioned end wall, said peripheral wall being in contact with the inner surface of said cylindrical member, the outer margin of the peripheral wall abutting the end wall of said cylindrical member, said two end walls having axially aligned openings, said cylindrical member and said peripheral wall each having a radial opening communicating one with the other, and locking means extending from said radial opening and between the end walls for securing said disc member, said cylindrical member and said support member to a shaft.

References Cited in the file of this patent
UNITED STATES PATENTS

| | | |
|---|---|---|
| 591,149 | Wilcox | Oct. 5, 1897 |
| 1,259,616 | Gilbert | Mar. 19, 1918 |
| 1,902,223 | Eksergian | Mar. 21, 1933 |
| 1,955,054 | Caswell | Apr. 17, 1934 |
| 2,395,169 | Crane et al. | Feb. 19, 1946 |
| 2,680,380 | Bagley | June 8, 1954 |
| 2,741,134 | Bagley | Apr. 10, 1956 |